United States Patent
Yoshimura et al.

(10) Patent No.: US 9,548,913 B2
(45) Date of Patent: *Jan. 17, 2017

(54) COMMUNICATION SYSTEM AND TRANSMISSION UNIT EMPLOYED IN SAME

(71) Applicant: Panasonic Corporation, Osaka (JP)

(72) Inventors: Yuichi Yoshimura, Osaka (JP); Tadashi Matsumoto, Hyogo (JP); Shinji Sakasegawa, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 99 days.

This patent is subject to a terminal disclaimer.

(21) Appl. No.: 14/353,340

(22) PCT Filed: Oct. 22, 2012

(86) PCT No.: PCT/JP2012/077237
§ 371 (c)(1),
(2) Date: Apr. 22, 2014

(87) PCT Pub. No.: WO2013/069442
PCT Pub. Date: May 16, 2013

(65) Prior Publication Data
US 2014/0321482 A1   Oct. 30, 2014

(30) Foreign Application Priority Data

Nov. 7, 2011  (JP) .................................. 2011-244012

(51) Int. Cl.
*H04L 12/26* (2006.01)
*H04Q 9/00* (2006.01)
(Continued)

(52) U.S. Cl.
CPC ........... *H04L 43/0876* (2013.01); *H04B 3/542* (2013.01); *H04B 3/58* (2013.01);
(Continued)

(58) Field of Classification Search
CPC ......... H04Q 9/00; H04L 43/0876; H04B 3/58; H04B 3/542
See application file for complete search history.

(56) References Cited

U.S. PATENT DOCUMENTS

| | | | | |
|---|---|---|---|---|
| 4,726,013 A | * | 2/1988 | Kawashima | .......... H04M 9/025 370/360 |
| 2010/0058098 A1 | * | 3/2010 | Saitou | ................ G05B 19/4189 713/400 |

(Continued)

FOREIGN PATENT DOCUMENTS

| | | |
|---|---|---|
| JP | 54-040303 B | 12/1979 |
| JP | 54-040304 B | 12/1979 |

(Continued)

OTHER PUBLICATIONS

International Search Report for corresponding International Application No. PCT/JP2012/077237 mailed Dec. 4, 2012.
Form PCT/ISA/237 for corresponding International Application No. PCT/JP2012/077237 dated Dec. 4, 2012.

*Primary Examiner* — Donald Mills
*Assistant Examiner* — Henry Baron
(74) *Attorney, Agent, or Firm* — Renner, Otto, Boisselle & Sklar, LLP

(57) ABSTRACT

Provided are a communication system that is capable of acquiring information having a relatively large data amount by a transmission unit while securing a communication speed of a transmission signal of transmission unit, and a transmission unit employed in communication system. Transmission unit transmits superimposition requesting data from a superimposition requesting unit to a second monitoring terminal in a transmission segment of transmission signal. Second monitoring terminal, upon receiving superimposition requesting data and with responding thereto, transmits, to transmission unit, monitoring data corresponding to a monitoring input from a sensor device with a (Continued)

superimposition signal superimposed on transmission signal as superimposition response data in a reply segment of transmission signal. Transmission unit, upon receiving superimposition response data composed of monitoring data with a superimposition communication unit, transmits control data to either a second control terminal or a first control terminal associated with this monitoring data in control table.

10 Claims, 13 Drawing Sheets

(51) Int. Cl.
  *H04B 3/54* (2006.01)
  *H04B 3/58* (2006.01)
(52) U.S. Cl.
  CPC ....... *H04Q 9/00* (2013.01); *H04B 2203/5416* (2013.01); *H04B 2203/5454* (2013.01); *H04Q 2209/75* (2013.01)

(56) References Cited

U.S. PATENT DOCUMENTS

| | | | |
|---|---|---|---|
| 2010/0118887 A1 | 5/2010 | Matsumoto et al. | |
| 2010/0135318 A1* | 6/2010 | Yin | H04B 3/54 370/445 |
| 2012/0301109 A1* | 11/2012 | Kobayashi | H04N 21/233 386/244 |
| 2014/0036976 A1* | 2/2014 | Shad | H04B 3/542 375/224 |

FOREIGN PATENT DOCUMENTS

| | | |
|---|---|---|
| JP | 57-037264 B | 8/1982 |
| JP | 08-274742 A | 10/1996 |
| JP | 2009-225328 A | 10/2009 |
| JP | 2011-205414 A | 10/2011 |
| KR | 20090128468 A | 12/2009 |
| WO | WO 2008/117722 A1 | 10/2008 |

* cited by examiner

COMMUNICATION SYSTEM AND TRANSMISSION UNIT EMPLOYED IN SAME

TECHNICAL FIELD

This invention relates to a communication system in which a first terminal that communicates by means of a transmission signal and a second terminal that communicates by means of a superimposition signal superimposed on the transmission signal are connected to the same communication line, and a transmission unit employed in the communication system.

BACKGROUND ART

Heretofore, communication systems in which a transmission unit (master) and a plurality of terminal devices (slaves) are connected to a transmission channel and communication is performed between the transmission unit and each of the terminal devices are in widespread use. An example of this kind of communication system is a system in which the transmission unit monitors states of the terminal devices periodically, and when there is a change in the state of one of the terminal devices, the transmission unit transmits a signal to another terminal device so as to perform processing corresponding to the state change (e.g., refer to Japanese Patent Publication No. 1180690, Japanese Patent Publication No. 1195362, Japanese Patent Publication No. 1144477).

Note that, the communication system having the aforementioned configuration is a system originally used for on-off control of lighting apparatuses or the like, and is not suited to transmitting information having a relatively large data amount such as data represented by an analog quantity, since the communication speed is slow.

In view of this, a communication system that is formed by mixing an existing communication system in which terminal devices communicate with each other via a transmission unit and a communication system in which terminal devices directly communicate with each other peer-to-peer (P2P) has been proposed (e.g., see Japanese Unexamined Patent Application Publication No. 2009-225328). In this communication system, since first terminals (first communication terminals) that communicate via the transmission unit (master) share a communication line (transmission channel) with second terminals (second communication terminals) that communicate with each other directly, the second terminals can be easily added to the existing communication system. The first terminals communicate by a transmission signal (signal conforming to a first protocol) that is repeatedly transmitted to the communication line from the transmission unit, and the second terminals perform higher speed communication by a superimposition signal (signal conforming to a second protocol) that is superimposed on the transmission signal.

Here, the transmission signal is a time-division signal that is divided, frame by frame, into a plurality of regions (periods) in the time axis direction, and some of the regions are assigned as superimposition allowable segments (communication suitable periods) in which a superimposition signal can be superimposed. That is, the second terminals communicate by the superimposition signal that is transmitted on the communication line, on which the transmission signal is also transmitted, in the superimposition allowable segments assigned to part of the transmission signal.

Incidentally, in the communication system described in aforementioned Japanese Unexamined Patent Application Publication No. 2009-225328, although the first terminals and the second terminals share the communication line, communication is performed between the first terminals or between the second terminals independently without interfering with each other, and transmitting and receiving data between a first terminal and a second terminal is not considered. However, in recent years, a flexible system is desired, in which apparatuses can be controlled based on the information having a relatively large data amount as in a case of data from sensor devices such as an image sensor and a power measurement unit. In this case, the transmission unit is required to acquire information having a relatively large data amount. However, the communication speed is not sufficient for acquiring information having a large data amount with the transmission signal of the transmission unit.

DISCLOSURE OF THE INVENTION

An object of the present invention is to provide a communication system and a transmission unit employed therein. The communication system is capable of acquiring information having a relatively large data amount with the transmission unit, while securing a communication speed of a transmission signal in the transmission unit.

A communication system according to one aspect of the present invention includes a transmission unit that repeatedly transmits a transmission signal to a communication line, a first terminal that communicates by the transmission signal, and a second terminal that communicates by a superimposition signal that is superimposed on the transmission signal. The transmission unit, the first terminal and the second terminal are connected to the communication line. The transmission signal is a time-division signal that is divided, frame by frame, into a plurality of regions in a time axis direction, including: a transmission segment for transmitting data to the first terminal; and a reply segment that is a time slot for receiving response data from the first terminal. The transmission unit includes a superimposition requesting unit configured to transmit superimposition requesting data to the second terminal, and a superimposition communication unit configured to receive superimposition response data that the second terminal transmits in the reply segment with the superimposition signal in response to the superimposition requesting data.

In the communication system, it is desirable that the superimposition requesting unit is configured to transmit the superimposition requesting data to the second terminal in the transmission segment with the transmission signal, and the second terminal includes a terminal side transmission communication unit configured to receive the superimposition requesting data transmitted with the transmission signal.

In the communication system, it is more desirable that the superimposition requesting unit is configured to transmit the superimposition requesting data to the second terminal in the reply segment with the superimposition signal.

In the communication system, it is more desirable that the superimposition communication unit is configured to receive the superimposition response data from the second terminal in the reply segment subsequent to the reply segment in which the superimposition requesting unit transmitted the superimposition requesting data.

In the communication system, it is more desirable that the transmission unit further includes a segment securing unit configured to transmit, with the transmission signal in the transmission segment, securing data for securing the reply segment for superimposition of the superimposition signal, by prohibiting transmission of the response data in the reply segment, with the superimposition requesting data as a trigger.

In the communication system, it is more desirable that the first terminal includes at least a first control terminal configured to control one or more first loads based on control data included in the transmission signal that is transmitted from the transmission unit, the second terminal includes a second monitoring terminal configured to generate monitoring data having a relatively large data amount in response to the superimposition requesting data from the transmission unit, and transmit the monitoring data to the transmission unit as the superimposition response data, and a second control terminal configured to control one or more second loads based on control data included in the superimposition signal that is transmitted from the transmission unit, and the transmission unit has a control table in which an address of the second monitoring terminal is associated with an address of the second control terminal, and determines, with the control table, whether control data generated based on the monitoring data included in the superimposition response data received from the second monitoring terminal is to be transmitted to the first control terminal or the second control terminal.

A transmission unit according to one aspect of the present invention is used in a communication system in which the transmission unit, a first terminal that communicates by a transmission signal, and a second terminal that communicates by a superimposition signal superimposed on the transmission signal are connected to a communication line. The transmission unit includes a transmission communication unit configured to repeatedly transmit, to the communication line, the transmission signal, which is a time-division signal divided, frame by frame, into a plurality of regions in a time axis direction, including a transmission segment for transmitting data to the first terminal and a reply segment that is a time slot for receiving response data from the first terminal, a superimposition requesting unit configured to transmit superimposition requesting data to the second terminal, and a superimposition communication unit configured to receive superimposition response data that is transmitted from the second terminal in response to the superimposition requesting data with the superimposition signal in the reply segment.

One aspect of the present invention has an advantage in that acquiring information having a relatively large data amount becomes possible with the transmission unit, while securing a communication speed of a transmission signal of the transmission unit.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Embodiment 1

Figure 1:
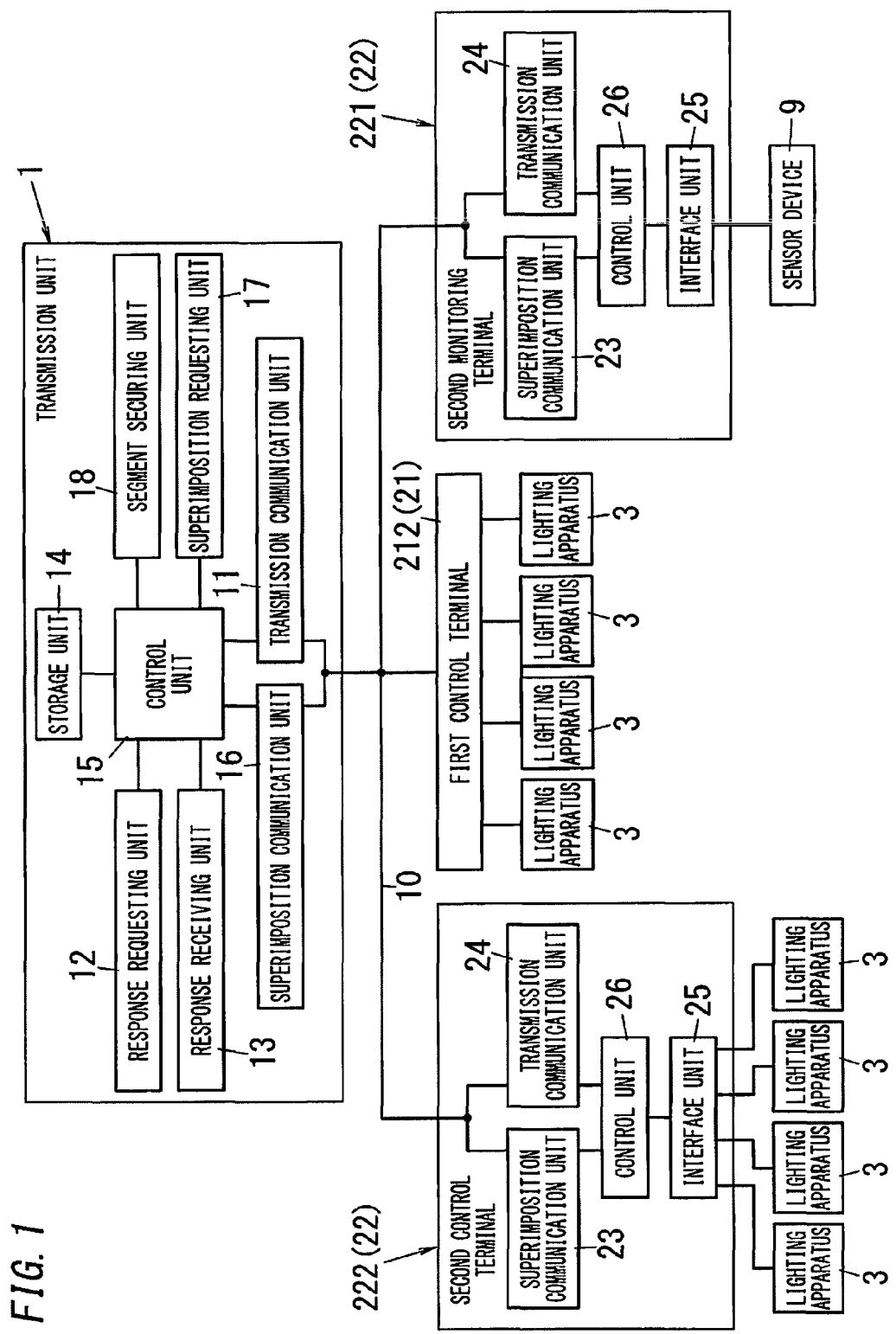
FIG. 1 is a block diagram illustrating a schematic configuration of a communication system according to Embodiment 1.
Figure 4:
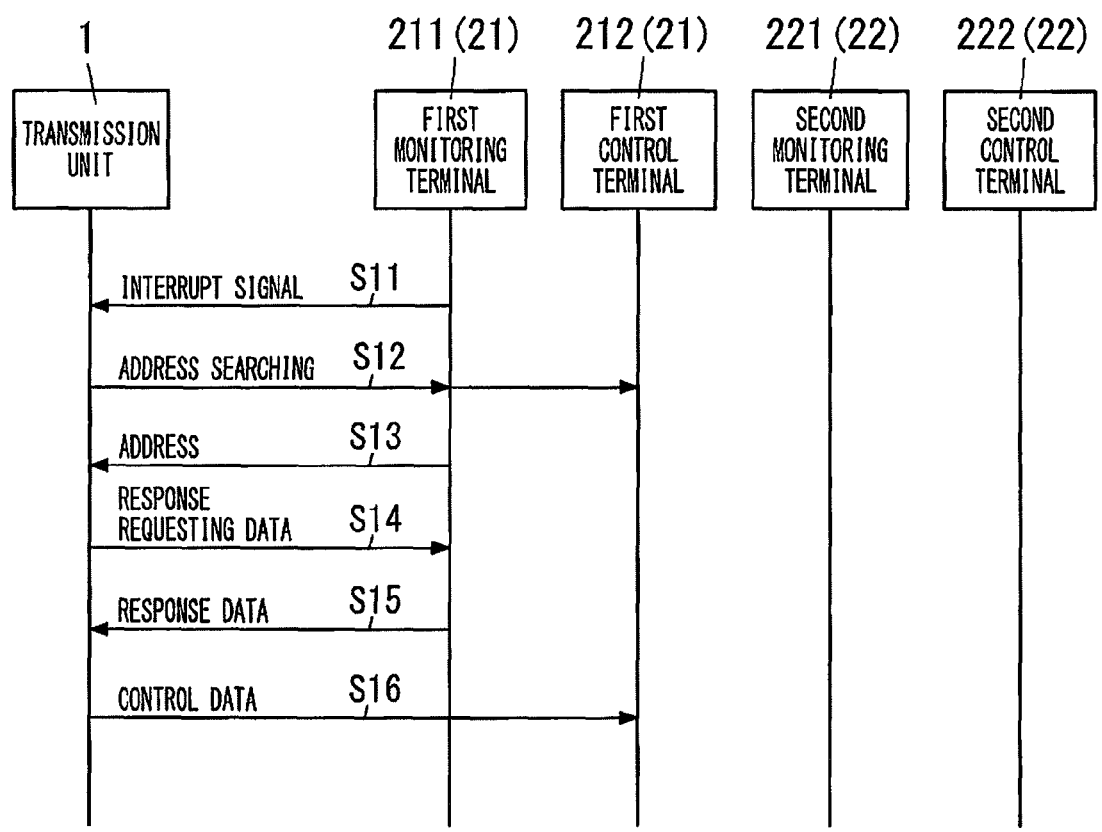
FIG. 4 is an explanatory diagram illustrating the operation of the basic system of the communication system according to Embodiment 1.

A communication system of the present embodiment includes, as shown in FIG. 1 for example, a transmission unit 1 serving as a master, and first terminals 21 and second terminals 22 serving as slaves. The transmission unit 1, first terminals 21 and second terminals 22 are connected to a two-wire communication line 10. In FIG. 1 (and similarly in FIGS. 2, 4, and 6), the first terminals 21 are denoted as first monitoring terminals or first control terminals and the second terminals 22 are denoted as second monitoring terminals or second control terminals. The reason for this will be explained later. In this communication system, basically, each first terminal 21 communicates by a transmission signal (signal conforming to a first protocol) transmitted on the communication line 10, and each second terminal 22 communicates by a superimposition signal (signal conforming to a second protocol) superimposed on the transmission signal.

Figure 2:
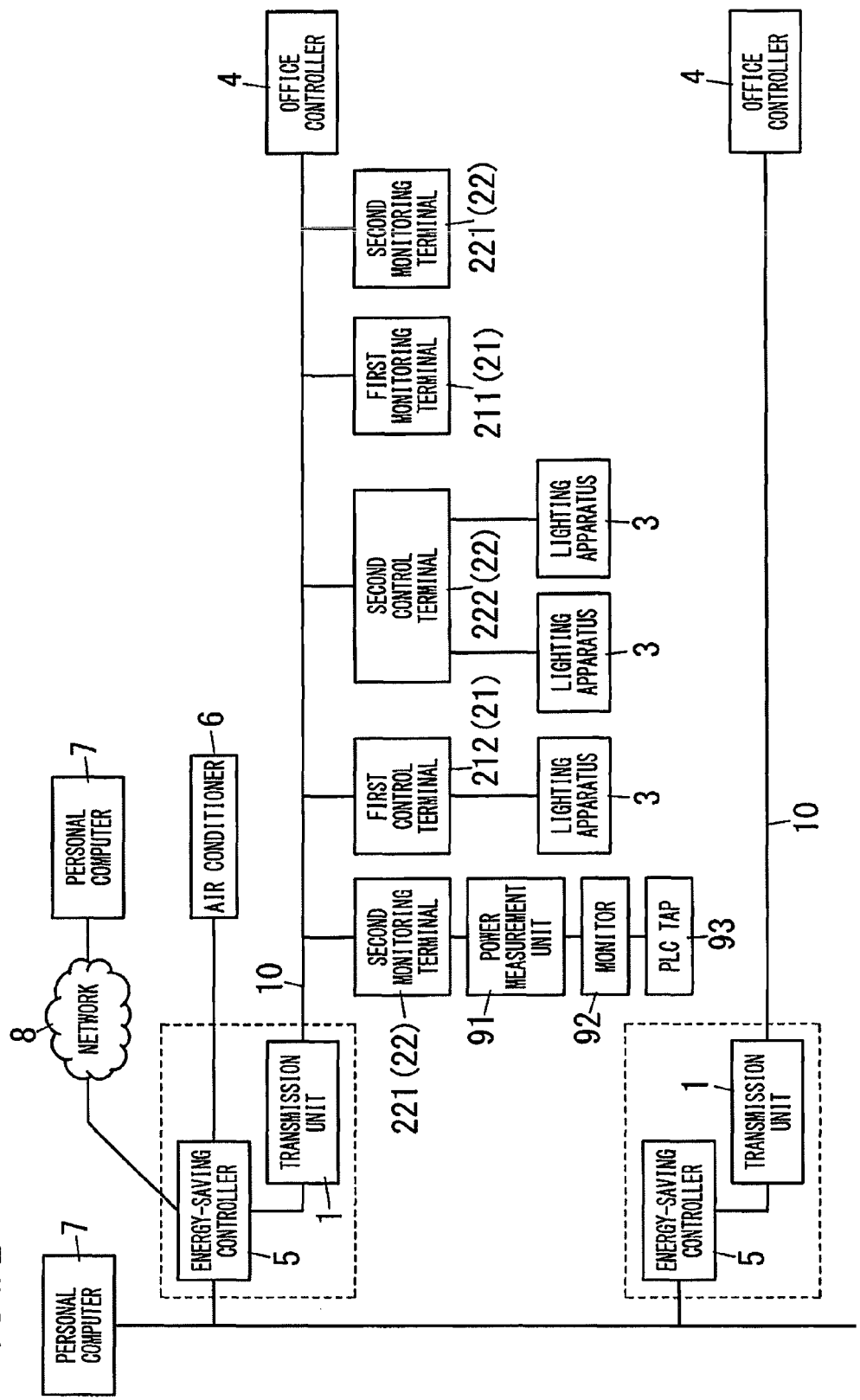
FIG. 2 is a configuration diagram of a lighting system that uses the communication system according to Embodiment 1.

FIG. 2 illustrates an example in which the communication system is applied to a lighting system for controlling lighting apparatuses 3 in an office building or the like. In the example shown in FIG. 2, one transmission unit 1 is provided for each area (floor, for example), and the one or more first terminals 21 and the one or more second terminals 22 are connected to the communication line 10 to which the transmission unit 1 is connected. Further, an office controller 4 that performs centralized monitoring control on the lighting control system is connected to the communication line 10.

Moreover, the transmission unit 1 is connected to an energy-saving controller 5 that is a device on an upstream side thereof. The energy-saving controller 5 is provided for each area (floor, for example), and performs overall monitoring control on an air conditioner 6 in addition to the lighting system to which the communication system is applied. The energy-saving controllers 5 in a plurality of areas are connected to a personal computer 7 having a browser function via a network 8 such as the Internet, or via a LAN, and are configured so as to be monitored by the personal computer 7. Note that, in the example shown in FIG. 2, a power measurement unit 91 is connected to one of the second monitoring terminals 221, and the power measurement unit 91 is configured to measure power consumption of an apparatus that is connected to a PLC tap 93 via a monitor 92.

The first terminals 21 are connected in parallel to the transmission unit 1 via the communication line 10. The transmission unit 1 and the first terminals 21 constitute a time division multiplex transmission system (hereinafter referred to as a "basic system") in which data transmission from the transmission unit 1 to each first terminal 21 and data transmission from each first terminal 21 to the transmission unit 1 are performed in a time-division manner. Hereinafter, first, a schematic configuration of the basic system will be described.

In the basic system, the first terminals 21 are classified into one of a first monitoring terminal 211 that monitors monitoring input of a switch (not shown) such as a wall switch and a first control terminal 212 that includes a relay (not shown) and performs on-off control or the like of loads (here, first loads, lighting apparatuses 3). Here, each of the first terminals 21 stores its own address assigned individually in advance in its own memory (not shown). Note that, the first monitoring terminal 211 may be configured to monitor a monitoring input not only generated by a switch but also generated automatically by a sensor such as a motion detector.

The transmission unit 1 includes, as shown in FIG. 1, a transmission communication unit 11 that transmits a transmission signal to the communication line 10, a response requesting unit 12 that transmits response requesting data to the first terminal 21, a response receiving unit 13 that receives response data from the first terminal 21, a storage unit 14, and a control unit 15. Further, the transmission unit 1 includes a superimposition communication unit 16, a superimposition requesting unit 17, and a segment securing unit 18. However, since the superimposition communication unit 16, the superimposition requesting unit 17, and the segment securing unit 18 provide functions that are not used in the basic system, detailed description thereof will be given later. The control unit 15 is configured to control operations of the response requesting unit 12, the response receiving unit 13, the superimposition communication unit 16, the superimposition requesting unit 17, and the segment securing unit 18. In the present embodiment, the transmission unit 1 is configured by a microcomputer as a main constituent element, and functions of the units are realized by executing programs stored in the storage unit 14.

The transmission unit 1 stores a control table in which the first monitoring terminals 211 are associated with the corresponding first control terminals 212 by addresses in the storage unit 14. Here, for example, when the first monitoring terminal 211 includes switches for a plurality of circuits, the one switch that has actually been operated cannot be specified with only the terminal address that is unique to the first monitoring terminal 211, since all the switches in the first monitoring terminal 211 are associated with the same address.

In order to specify the one switch that has actually been operated, in the first monitoring terminal 211, a load number is assigned to each of the switches, and addresses in which the load numbers are each added after the terminal address of the first monitoring terminal 211 are used as addresses (identifiers) unique to the respective switches. Similarly, in the first control terminal 212, a load number is assigned to each of the relays, and addresses in which the load numbers are each added after the terminal address of the first control terminal 212 are used as addresses (identifiers) unique to the respective relays. In the control table, addresses unique to the respective switches are associated with addresses unique to the respective relays in one-to-one or one-to-many correspondence.

Next, an operation of the basic system will be described.

Figure 3:
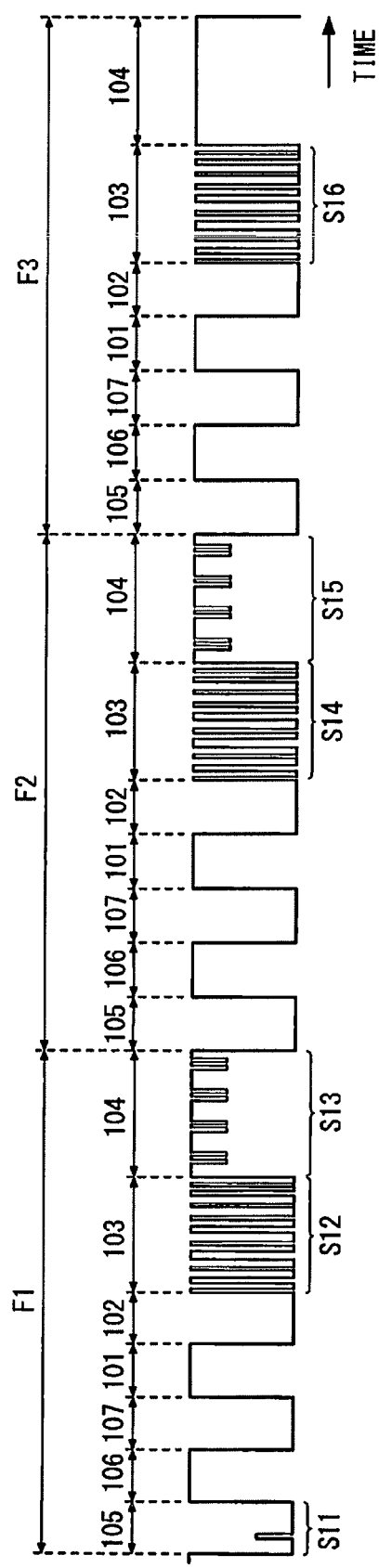
FIG. 3 is an explanatory diagram illustrating an operation of a basic system of the communication system according to Embodiment 1.

The transmission unit 1 repeatedly is configured to transmit a transmission signal which is a time-division signal to the communication line 10. The transmission signal is constituted by a voltage waveform in a format in which one cycle of the waveform is divided into a plurality of regions in the time axis direction, as shown in FIG. 3. That is, the transmission signal is a bipolar (±24V) time division multiplex signal that is constituted by seven segments consisting of a spare interrupt segment 101, a spare segment 102, a transmission segment 103, a reply segment 104, an interrupt segment 105, a short-circuit detection segment 106, and a pause segment 107. Note that, in the example shown in the diagram, one frame (F1, F2, . . . ) in the transmission signal begins with the interrupt segment 105 and ends with the reply segment 104. However, one frame is not limited thereto, and for example, one frame may begin with the reply segment 104 and end with the transmission segment 103.

The spare interrupt segment 101 is a period for detecting occurrence of a secondary interrupt, the spare segment 102 is a period set with the interrupt segment 105 and the short-circuit detection segment 106, and the transmission segment 103 is a period for transmitting data to the first terminal 21. The reply segment 104 is a time slot for receiving response data from the first terminal 21, the interrupt segment 105 is a period for detecting occurrence of an interrupt signal described later, and the short-circuit detection segment 106 is a period for detecting a short circuit. The pause segment 107 is a period for processing that is not finished in an assigned time slot.

The transmission unit 1 is normally configured to transmit a transmission signal with mode data indicating a normal mode, and perform consecutive polling in which address data included in the transmission segment 103 of this transmission signal is changed sequentially so as to access the first terminals 21 sequentially. When the consecutive polling is performed, the first terminal 21 whose own address matches the address data included in the transmission segment 103 receives data included in the transmission segment 103 and transmits response data to the transmission unit 1 in the subsequent reply segment 104 (that is, the first reply segment 104 after the transmission segment 103). Here, the first terminal 21 is configured to transmit the response data by a current mode signal (a signal transmitted by short-circuiting the communication line 10 via an appropriate low impedance) that is synchronized with the reply segment 104 of the transmission signal. Note that electric power to an internal circuit of the first terminal 21 is supplied by rectifying and stabilizing the transmission signal transmitted via the communication line 10.

On the other hand, the first terminal 21 serving as the first monitoring terminal 211 is configured to generate an interrupt signal in synchronization with the interrupt segment 105 of the transmission signal when detecting a monitoring input. Hereinafter, an operation of the basic system in the communication system shown in FIG. 1 when an interrupt signal is generated in the first monitoring terminal 211 will be described with reference to FIGS. 3 and 4.

The transmission unit 1, upon detecting the interrupt signal generated by the first monitoring terminal 211 in the interrupt segment 105 of a first frame F1 of the transmission signal (S11 in FIGS. 3 and 4), switches the mode data included in the transmission segment 103 of the transmission signal from the normal mode to an interrupt polling mode. In the interrupt polling mode, the transmission unit 1 performs address searching in which response requesting data composed of upper bits of an address is transmitted with the response requesting unit 12 in the transmission segment 103 of the transmission signal (S12), while the address (upper bits) being changed sequentially. The first monitoring terminal 211 that has generated the interrupt signal transmits, if the address (upper bits) in the response requesting data matches the upper bits of its own address, the lower bits of its own address as the response data to the transmission unit 1 in the reply segment 104 of the first frame F1 (S13). Accordingly, the transmission unit 1 receives, with the response receiving unit 13, the address of the first monitoring terminal 211 that has generated the interrupt signal as the response data in the first frame F1.

The transmission unit 1, upon acquiring the address of the first monitoring terminal 211 that has generated the interrupt signal, transmits response requesting data from the response requesting unit 12 to the first monitoring terminal 211 by designating the address in the transmission segment 103 of a second frame F2 that is a frame subsequent to the first frame F1 (S14). The first monitoring terminal 211, upon receiving the response requesting data including its own address and with responding thereto, transmits monitoring data that includes a load number and an on/off state of a switch corresponding to the monitoring input in the reply segment 104 of the second frame F2 as response data to the transmission unit 1 (S15).

The transmission unit 1, upon receiving the response data including the monitoring data with the response receiving unit 13, transmits control data to a first control terminal 212 that is associated with this monitoring data in the control table, in the transmission segment 103 of a third frame F3 that is a frame subsequent to the second frame F2 (S16). With this, the first control terminal 212 that has received the control data controls turning on/off of lighting apparatuses 3 according to the control data.

As described above, in the basic system, the first terminals 21 (first monitoring terminal 211, first control terminal 212) communicate with each other via the transmission unit 1, in conformity with a protocol of a polling/selecting method (first protocol).

Incidentally, in the communication system according to the present embodiment, the second terminal 22 is configured to perform communication by a superimposition signal superimposed on the transmission signal, while sharing the communication line 10 with the basic system described above. In the present embodiment, since the transmission unit 1 includes the superimposition communication unit 16 (see FIG. 1) that performs communication conforming to the second protocol with the superimposition signal, communication conforming to the second protocol is possible not only between the second terminals 22, but also between the transmission unit 1 and the second terminal 22.

The second terminals 22 are, similarly to the first terminals 21, classified into one of two kinds, that is a second monitoring terminal 221 that monitors the monitoring input from a sensor or the like and a second control terminal 222 that controls loads (here, second loads, lighting apparatuses 3). Here, each of the second terminals 22 stores its own address assigned individually in advance in its own memory (not shown). Note that, an address area that is assignable to the first terminal 21 is different from that of the second terminal 22. Hereinafter, description will be given assuming a case where addresses "1" to "128" are available to the communication system as a whole, "1" to "64" are assigned to the address area of the first terminal 21, and "65" to "128" are assigned to the address area of the second terminal 22.

Note that, as for the second terminal 22, when a plurality of sensors or loads are connected to one second terminal 22, a unique address is not assigned to the second terminal 22, but is assigned to each of the sensors or loads. That is, to a second control terminal 222 having four loads connected thereto, for example, four addresses in total such as "65", "66", "67", and "68" are assigned.

The second terminal 22 includes, as shown in FIG. 1, a (terminal side) superimposition communication unit 23 that performs communication by the superimposition signal, a (terminal side) transmission communication unit 24 that is capable of at least receiving the transmission signal, an interface unit 25, and a (terminal side) control unit 26. To the interface unit 25, sensor devices and lighting apparatuses 3 described later are connected. The control unit 26 is configured to control operations of the superimposition communication unit 23, the transmission communication unit 24, and the interface unit 25. In the present embodiment, the second terminal 22 is configured by a microcomputer as a main constituent element, and functions of the units are realized by executing programs stored in the memory (not shown).

Here, the superimposition signal is a signal whose frequency is sufficiently higher than that of the transmission signal, and a data amount that is transmittable in one frame (of the transmission signal) is sufficiently large. Therefore, a communication speed of communication conforming to the second protocol can be increased compared with communication conforming to the first protocol. The communication conforming to the second protocol is appropriate for transmission of information having a relatively large data amount such as an analog quantity.

Accordingly, as shown in FIG. 1, the second monitoring terminal 221 has sensor devices 9 such as an image sensor (not shown) and a power measurement unit 91 (see FIG. 2) connected thereto, and is used for communication of monitoring data having a relatively large data amount. The second control terminal 222 is not used for simple on-off control of lighting apparatuses 3, but is used for communication of control data having a relatively large data amount for dimming control, color adjustment control, or the like. That is, the second control terminal 222 is connected to lighting apparatuses 3 that are capable of dimming control and color adjustment control, and is configured to control the lighting apparatuses 3 according to control data that is transmitted with the superimposition signal.

The second terminal 22 of the present embodiment is configured so as to be capable of bidirectional communication, by the transmission communication unit 24, with the transmission unit 1 by the transmission signal similarly to the first terminal 21. That is, the second terminal 22 is capable of not only performing communication by the superimposition signal, but also, similarly to the first terminal 21, transmitting response data to the transmission unit 1 with the transmission signal in response to response requesting data from the response requesting unit 12. The second monitoring terminal 221, when a sensor device 9 constituted by an illuminance sensor is connected thereto for example, uses the superimposition signal for transmitting a measured value (illuminance) of the sensor device 9, and uses the transmission signal for transmitting monitoring data having a relatively small data amount that shows whether or not the measured value is greater than or equal to a predetermined threshold or the like.

Note that, the monitoring data is generated by the sensor device 9, and the second monitoring terminal 221 functions as an adapter that converts the monitoring data inputted from the sensor device 9 and transmits the converted result to the communication line 10. Similarly, the control data is generated by the transmission unit 1, and the second control terminal 222 functions as an adapter that converts the control data received from the communication line 10 so as to conform to a standard of the lighting apparatus 3, and outputs the converted result to the lighting apparatus 3. Note that, an example of the standard of the lighting apparatus 3 connected to the second control terminal 222 is a DALI (Digital Addressable Lighting Interface).

The second terminal 22 and the transmission unit 1 have a function of monitoring the transmission signal used in the basic system and of analyzing the data transmission condition of the transmission signal (hereinafter referred to as "state"). Here, the second terminal 22 monitors the transmission signal with the transmission communication unit 24, and the transmission unit 1 monitors the transmission signal with the transmission communication unit 11. The second terminal 22 and the superimposition communication unit 16 are configured to determine whether or not the state indicates an appropriate condition for superimposing the superimposition signal, and superimpose the superimposition signal on the transmission signal at a timing at which the state is determined to be appropriate for the transmission.

In the present embodiment, the second terminal 22 and the superimposition communication unit 16 use the reply segment 104 (see FIG. 3), as a superimposition allowable segment, in the transmission signal for superimposing the superimposition signal. That is, in the reply segment 104, even when the superimposition signal is superimposed on the transmission signal, communication conforming to the first protocol is not affected and the superimposition signal is also unlikely to be affected by the transmission signal. Further, the reply segment 104 has a longer period in which the transmission signal stays at a high level or a low level and a higher occupancy ratio in one frame of the transmission signal, compared with the spare interrupt segment 101, the spare segment 102, and the pause segment 107, and as a result the reply segment 104 is appropriate for superimposing the superimposition signal.

The other segments (transmission segment 103, interrupt segment 105, and short-circuit detection segment 106) have a relatively short period in which the transmission signal stays at a high level or a low level, and communication conforming to the first protocol is likely to be affected when the superimposition signal is superimposed in these segments. Moreover, when the superimposition signal is superimposed in the other segments described above, the superimposition signal is also likely to be affected by signals (interrupt signal and transmission data) that are transmitted and received between the transmission unit 1 and the first terminal 21. Therefore, in the present embodiment, the segments other than the reply segment 104 are segments that are not used for superimposing the superimposition signal (hereinafter referred to as "superimposition prohibited segment").

Note that, rising and falling periods of the transmission signal are also not appropriate for superimposing the superimposition signal due to the effect of harmonic noise and the influence of a transient response accompanied by a voltage inversion of a signal. Therefore, in the reply segment 104 of the transmission signal, a period of a predetermined time (such as 300 µs) after the segment is changed to (rising period of) the reply segment 104 is a superimposition prohibited segment.

The second terminal 22 and the superimposition communication unit 16 are configured to determine whether the segment is the superimposition allowable segment or the superimposition prohibited segment based on a result of analyzing the state of the transmission signal and transmit a superimposition signal only when the segment is determined to be the superimposition allowable segment. The second terminal 22 and the superimposition communication unit 16, by superimposing the superimposition signal only in the superimposition allowable segment of the transmission signal in synchronization with the transmission signal in this way, avoid interference between communication conforming to the first protocol and communication conforming to the second protocol that share the communication line 10.

Here, the second terminal 22 and the superimposition communication unit 16 are configured to stop, when an amount of data that is to be transmitted is too large to be transmitted in one superimposition allowable segment (reply segment 104), the communication at the end of the superimposition allowable segment, and transmit the remaining data in the subsequent superimposition allowable segment. That is, the second terminal 22 and the superimposition communication unit 16 are configured to combine, when receiving data that is divided and transmitted with the superimposition signal in different frames, the data that have been transmitted separately to form one piece of data, and divide the data in lengths such that the divided data can be superimposed in the superimposition allowable segment when transmitting the superimposition signal.

Note that electric power to the second terminal 22 is, similarly to the first terminal 21, supplied by a method in which the transmission signal transmitted from the transmission unit 1 via the communication line 10 is rectified and stabilized (centralized power supply method). However, the power supply is not limited to this configuration and the electric power to the second terminal 22 may be supplied by a method in which the commercial power supply is rectified and stabilized (localized power supply method).

Incidentally, in the communication system of the present embodiment, the first terminal 21 and the second terminal 22 not only share the communication line 10, but are configured to be capable of transmitting and receiving data therebetween via the transmission unit 1. Specifically, in the control table in the storage unit 14 of the transmission unit 1, an address of the second monitoring terminal 221 (address unique to each sensor) is associated with an address of the first control terminal 212 (address unique to each relay). Accordingly, the transmission unit 1 is capable of controlling loads (lighting apparatuses 3) that is connected to the first control terminal 212 in accordance with a monitoring input generated in the second monitoring terminal 221. Note that, in the control table, an address of the first monitoring terminal 211 is also associated with an address of the second control terminal 222.

However, in the following, description will be given of a case, as an example, where an address of the second monitoring terminal 221 is associated with an address of the second control terminal 222 in the control table, and a load (lighting apparatus 3) connected to the second control terminal 222 is controlled in accordance with a monitoring input generated in the second monitoring terminal 221.

Here, the transmission unit 1 is configured to transmit superimposition requesting data to the second monitoring terminal 221 with the superimposition requesting unit 17 in order to acquire data (superimposition response data) by the superimposition signal from the second monitoring terminal 221, and receive superimposition response data with the superimposition communication unit 16. In the present embodiment, the transmission unit 1 is configured to acquire periodically (every 5 minutes, for example) output data of a sensor device 9 (such as image sensor and power measurement unit 91) connected to the second monitoring terminal 221 as the superimposition response data from the second monitoring terminal 221. Here, the superimposition response data includes output data from the sensor device 9 (image, electric power information, temperature, humidity, $CO_2$ amount, presence or absence of person, or the like) that is to be the monitoring input, address information of the second monitoring terminal 221 that is a transmitter, length information indicating a data length, timing information, location information, and the like.

That is to say, the superimposition requesting unit 17 is configured to transmit periodically the superimposition requesting data to request the superimposition response data to the second monitoring terminal 221. The superimposition requesting unit 17 is configured to transmit the superimposition requesting data with the transmission signal via the transmission communication unit 11. Specifically, the response requesting data that is transmitted from the response requesting unit 12 includes a superimposition response flag, and the superimposition requesting unit 17 turns on the superimposition response flag when requesting the superimposition response data. That is, the response requesting data and the superimposition requesting data have the same basic data structure, and are distinguished by the superimposition response flag such that the data is the response requesting data if the superimposition response flag is off, and is the superimposition requesting data if the superimposition response flag is on.

In this way, due to the response requesting data and the superimposition requesting data being distinguished by the superimposition response flag, the second monitoring terminal 221 determines whether the superimposition response data (superimposition signal) or the response data (transmission signal) is to be transmitted according to the on/off state of the superimposition response flag. Note that, if the second terminal 22 does not have a function of transmitting response data with the transmission signal, and the second monitoring terminal 221 is capable of only transmitting superimposition response data, the superimposition requesting unit 17 may use address data composed of an address of the second monitoring terminal 221 as the superimposition requesting data.

The second monitoring terminal 221 is configured to receive superimposition requesting data by the transmission signal from the transmission unit 1 with the transmission communication unit 24. The second monitoring terminal 221, upon receiving the superimposition requesting data, is configured to transmit, in response thereto, superimposition response data with the superimposition signal to the transmission unit 1 via the superimposition communication unit 23.

The superimposition communication unit 16 is configured to receive the superimposition response data by the superimposition signal transmitted from the second monitoring terminal 221 in the superimposition allowable segment (reply segment 104). In short, the transmission unit 1 receives, with the superimposition communication unit 16, the superimposition response data transmitted by the second monitoring terminal 221 in response to the superimposition requesting data in the reply segment 104 of the transmission signal with the superimposition signal. As a result, the transmission unit 1 can periodically acquire output data (monitoring input) of the sensor device 9 connected to the second monitoring terminal 221 as the superimposition response data.

The transmission unit 1 is configured to control the loads (lighting apparatuses 3) connected to the second control terminal 222 by transmitting control data to the second control terminal 222 based on the superimposition response data acquired from the second monitoring terminal 221. The correspondence between the second monitoring terminal 221 and the second control terminal 222 is basically set in the control table, but the configuration is not limited thereto, and the superimposition response data may include the address of the load (lighting apparatus 3) that is the target for the control. Further, the superimposition response data may include specific control contents relating to dimming control, color adjustment control and the like, for example.

Here, since the transmission unit 1 employs the superimposition signal that is superimposed on the transmission signal in the reply segment 104 when transmitting control data to the second control terminal 222, interference, in the reply segment 104, between the response data from the first terminal 21 and the control data (superimposition signal) needs to be avoided. Therefore, in the communication system of the present embodiment, the transmission unit 1 includes the segment securing unit 18 that transmits, in the transmission segment 103 of the transmission signal, securing data so as to secure the subsequent reply segment 104 (that is, the first reply segment 104 after the transmission segment 103) for superimposition of the superimposition signal.

The segment securing unit 18 is configured to transmit, with specific superimposition response data or response data as a trigger, the securing data from the transmission communication unit 11 in synchronization with the transmission segment 103 of the transmission signal. Here, the securing data is data for securing the subsequent reply segment 104 for superimposition of the superimposition signal by prohibiting transmission of response data in the subsequent reply segment 104 (that is, the first reply segment 104 after the transmission of securing data), and is dummy data composed of an empty packet having no specific meaning for example. That is, since the first terminal 21 transmits response data only when its own address (or upper bits) is included in the response requesting data transmitted in the transmission segment 103, none of the first terminals 21 transmit response data in the subsequent reply segment 104 after the transmission segment 103 in which the securing data is transmitted. Therefore, the subsequent reply segment 104 after the transmission segment 103 in which the securing data is transmitted from the segment securing unit 18 is secured for superimposition of the superimposition signal without response data being transmitted from the first terminal 21.

As a trigger to transmit the securing data, the segment securing unit 18 uses data that is associated with control data to the second terminal 22, among superimposition response data from the second terminal 22 or response data from the first terminal 21. In the present embodiment, the segment securing unit 18 is configured to transmit the securing data with superimposition response data or response data associated with the second control terminal 222 in the control table as a trigger.

In other words, the transmission unit 1 determines whether a terminal to which control data is transmitted is the first terminal 21 or the second terminal 22 based on the superimposition response data or the response data, and if the terminal is determined to be the second terminal 22, the transmission unit 1 transmits the securing data from the segment securing unit 18 in the subsequent transmission segment 103 (that is, the first transmission segment 103 thereafter). In short, the transmission unit 1, when the superimposition response data or the response data corresponds to the address area ("65" to "128") of the second terminal 22 in the control table, transmits the securing data in the subsequent transmission segment 103 (that is, the first transmission segment 103 thereafter) with this superimposition response data or response data as a trigger. Accordingly, the transmission unit 1 can secure the reply segment 104 for transmitting control data to the second control terminal 222.

The superimposition communication unit 16 is configured to transmit control data to the second control terminal 222 with the superimposition signal in the reply segment 104 secured by the securing data, that is in the subsequent reply segment 104 after the transmission segment 103 in which the securing data is transmitted. Therefore, in this reply segment 104, control data can be transmitted from the transmission unit 1 to the second control terminal 222 without the response data from the first terminal 21 interfering with the superimposition signal.

Hereinafter, an operation, in the communication system shown in FIG. 1, in a case where the lighting apparatus 3 connected to the second control terminal 222 is controlled according to a monitoring input generated in the second monitoring terminal 221 will be described with reference to FIGS. 5 and 6.

Figure 5:
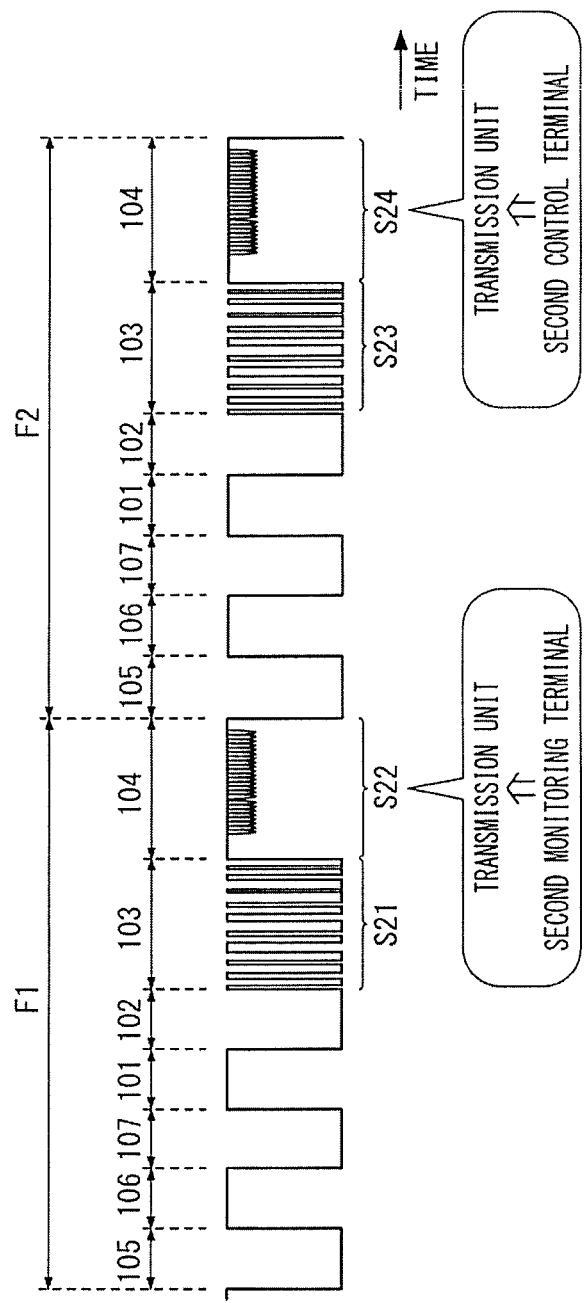
FIG. 5 is an explanatory diagram illustrating an operation of the communication system according to Embodiment 1.
Figure 6:
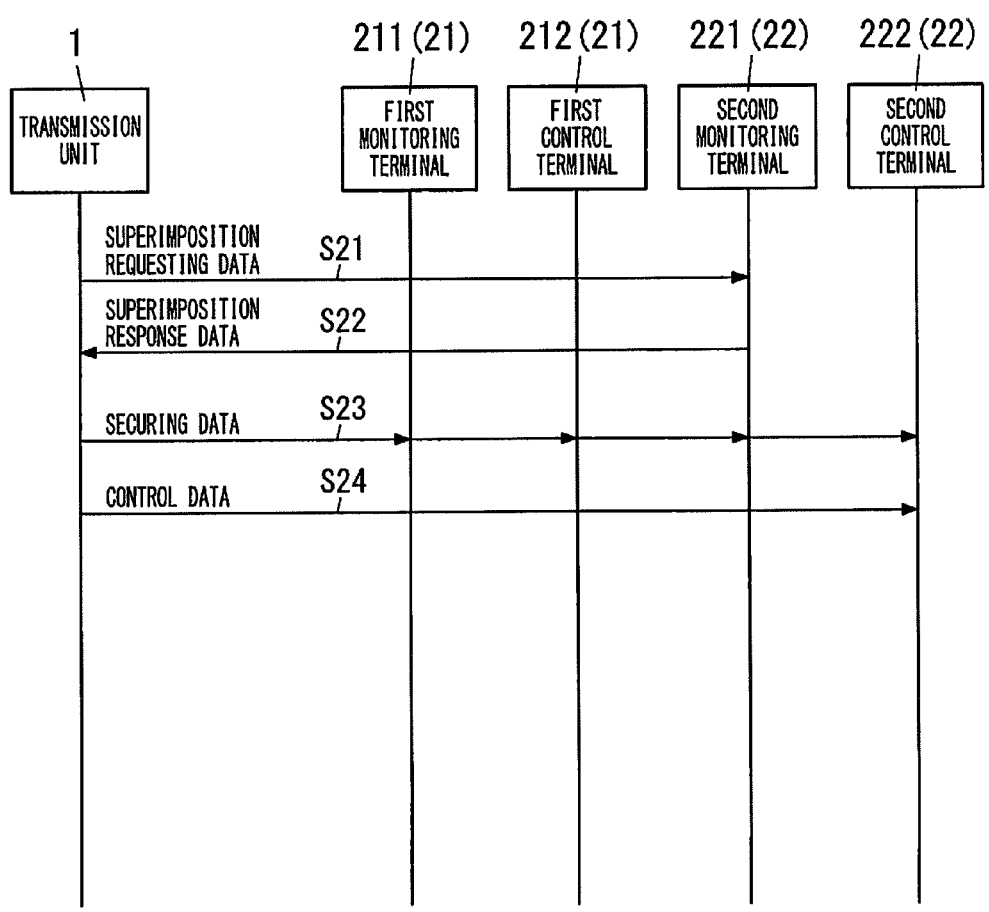
FIG. 6 is an explanatory diagram illustrating the operation of the communication system according to Embodiment 1.

The transmission unit 1 transmits the superimposition requesting data from the superimposition requesting unit 17 to the second monitoring terminal 221 in the transmission segment 103 of the first frame F1 of the transmission signal (S21 in FIGS. 5 and 6). The second monitoring terminal 221, upon receiving the superimposition requesting data including its own address and with responding thereto, transmits monitoring data corresponding to the monitoring input from the sensor device 9 as the superimposition response data to the transmission unit 1 in the reply segment 104 of the first frame F1 with the superimposition signal (S22).

The transmission unit 1, upon receiving the superimposition response data composed of the monitoring data with the superimposition communication unit 16, determines whether a terminal that is associated with this monitoring data in the control table is the first control terminal 212 or the second control terminal 222. If the monitoring data is determined to be associated with the second control terminal 222, the transmission unit 1 transmits the securing data from the segment securing unit 18 in the transmission segment 103 of the second frame F2 subsequent to the first frame F1 (S23).

Accordingly, the reply segment 104 subsequent to the transmission segment 103 in which the securing data is transmitted is secured for superimposition of the superimposition signal, and the transmission unit 1 transmits the control data to the second control terminal 222 in this reply segment 104 (of the second frame F2) with the superimposition signal (S24). The second control terminal 222 that has received the control data performs dimming control and/or color adjustment control of the lighting apparatus 3 according to the control data.

According to the communication system as described above, since the transmission unit 1 includes the superimposition requesting unit 17 that transmits the superimposition requesting data and the superimposition communication unit 16 that receives the superimposition response data by the superimposition signal from the second terminal 22, the transmission unit 1 can acquire information having a relatively large data amount. That is, with the communication system according to the present embodiment, since the second monitoring terminal 221 can transmit the monitoring data to the transmission unit 1 with the superimposition signal, monitoring data having a relatively large data amount such as measured values of the sensor device 9 can be transmitted, while securing the communication speed of the transmission signal of the transmission unit 1. Therefore, according to this communication system, a flexible system can be provided, in which the transmission unit 1 controls apparatuses based on information having a relatively large data amount.

Moreover, since the transmission unit 1 transmits the superimposition requesting data to the second monitoring terminal 221 in the transmission segment 103 of the transmission signal and receives the superimposition response data in the reply segment 104, transmitting the superimposition requesting data and receiving the superimposition response data can be performed in the same frame. Therefore, in the transmission unit 1, the period required for acquiring the superimposition response data from the second monitoring terminal 221 can be reduced.

Moreover, in the present embodiment, the transmission unit 1 includes the segment securing unit 18 that transmits the securing data so as to secure the subsequent reply segment 104 (that is, the first reply segment 104 thereafter) for superimposition of the superimposition signal with specific superimposition response data or response data as a trigger. Therefore, the superimposition communication unit 16 can transmit the control data (superimposition signal) to the second control terminal 222, while avoiding interference, in the reply segment 104, between the response data transmitted from the first terminal 21 to the transmission unit 1 and the superimposition signal.

Incidentally, since the second terminal 22, with the transmission communication unit 24, is capable of communication by the transmission signal, similarly to the first terminal 21, the second terminal 22 can initiate communication with the transmission unit 1 spontaneously by generating an interrupt signal. For example, in a case where a sensor device 9 connected to the second monitoring terminal 221 is an illuminance sensor and a measured value (illuminance) is changed rapidly due to opening/closing a blind or the like, which causes the measured value to become less than or equal to a predetermined threshold or greater than or equal to a predetermined threshold, the lighting apparatus 3 is desirably controlled promptly. Then, in this case, the second monitoring terminal 221 transmits superimposition response data spontaneously to the transmission unit 1 by generating an interrupt signal without waiting for the superimposition requesting data that is transmitted periodically.

Figure 7:
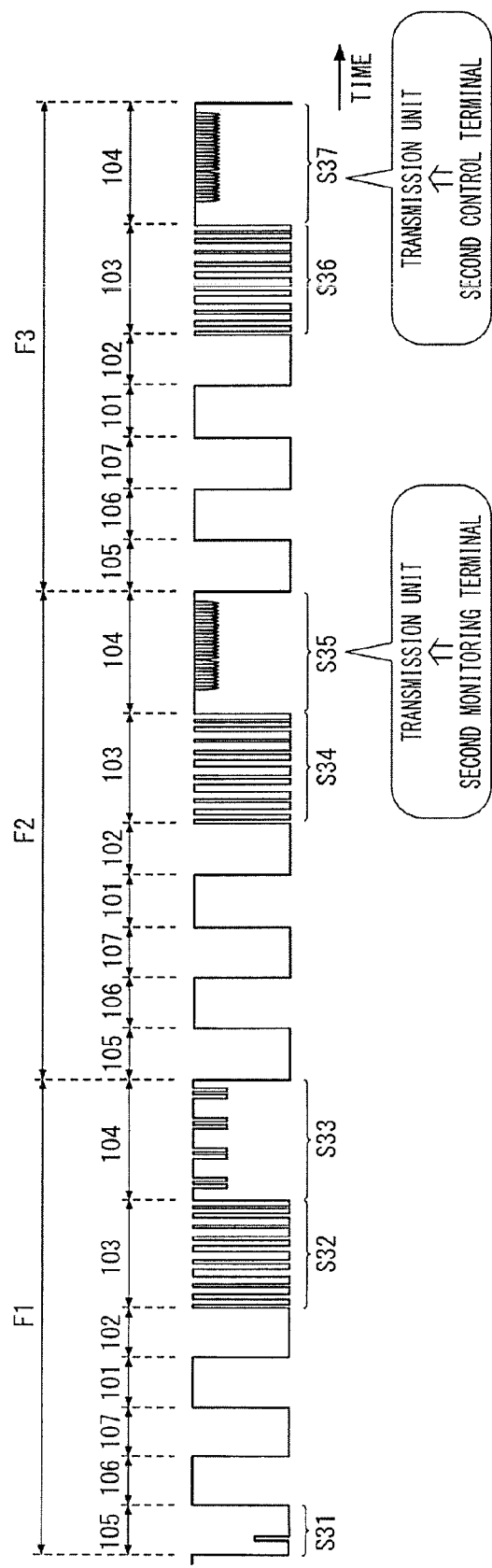
FIG. 7 is an explanatory diagram illustrating another operation of the communication system according to Embodiment 1.
Figure 8:
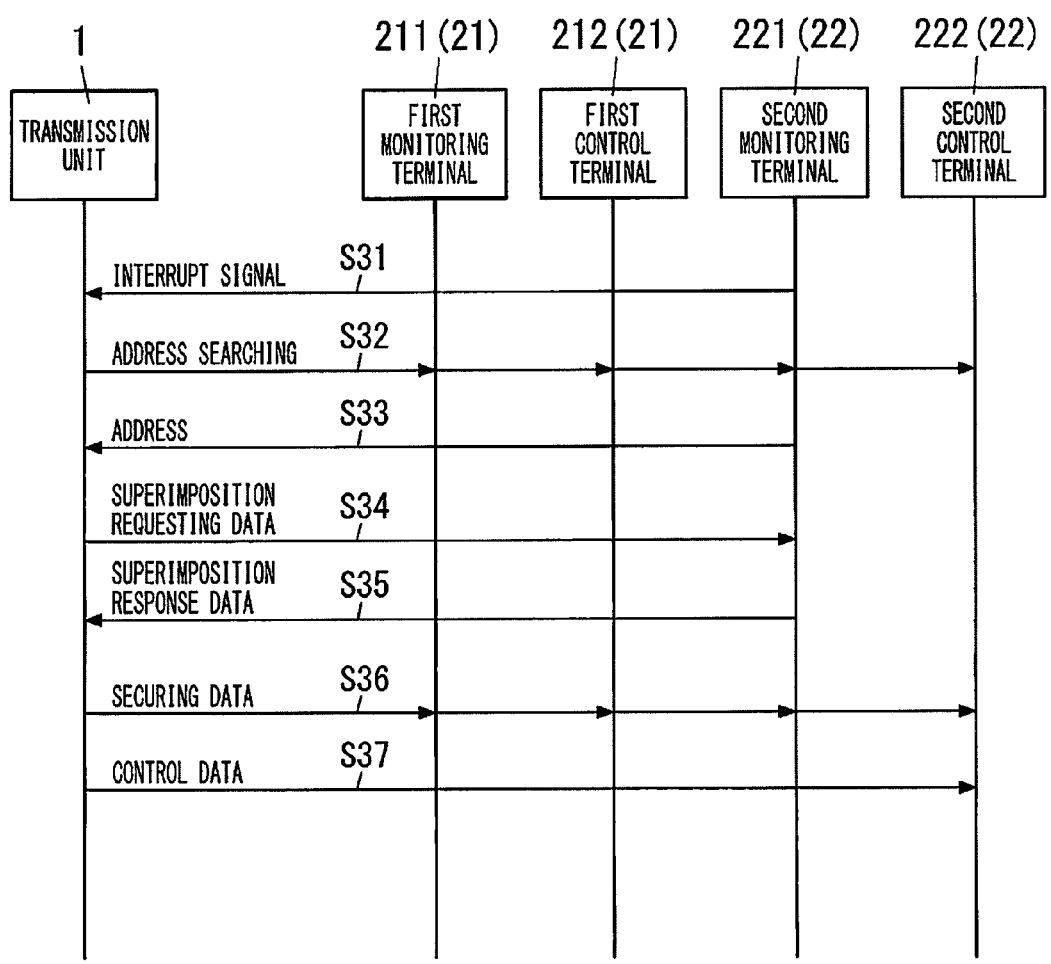
FIG. 8 is an explanatory diagram illustrating the operation of the communication system according to Embodiment 1.

Hereinafter, in the communication system shown in FIG. 1, an operation when an interrupt signal is generated in the second monitoring terminal 221 will be described with reference to FIGS. 7 and 8. Note that since operations "S34" to "S37" in FIGS. 7 and 8 are similar to operations "S21" to "S24" in FIGS. 5 and 6, description thereof will be omitted here.

The transmission unit 1, upon detecting the interrupt signal generated in the second monitoring terminal 221 in the interrupt segment 105 of the first frame F1 of the transmission signal (S31 in FIGS. 7 and 8), switches the mode data included in the transmission segment 103 of the transmission signal from a normal mode to an interrupt polling mode. In the interrupt polling mode, the transmission unit 1 performs address searching in which response requesting data composed of upper bits of the address is transmitted with the response requesting unit 12 in the transmission segment 103 of the transmission signal (S32), with the address (upper bits) being changed sequentially. The second monitoring terminal 221 that has generated the interrupt signal transmits, if the address (upper bits) in the response requesting data matches the upper bits of its own address, the lower bits of its own address as the response data to the transmission unit 1 in the reply segment 104 of the first frame F1 (S33). Accordingly, the transmission unit 1 receives, with the response receiving unit 13, the address of the second monitoring terminal 221 that has generated the interrupt signal as the response data in the first frame F1.

The transmission unit 1, upon acquiring the address of the second monitoring terminal 221 that has generated the interrupt signal, transmits the superimposition requesting data from the superimposition requesting unit 17 to the second monitoring terminal 221 by designating the address in the transmission segment 103 of the second frame F2 subsequent to the first frame F1 (S34). Note that, after the generation of the interrupt signal, all communication between the second monitoring terminal 221 and the transmission unit 1 is performed by the transmission signal until the transmission unit 1 acquires the address of the second monitoring terminal 221.

According to this configuration, the second monitoring terminal 221 can transmit the superimposition response data to the transmission unit 1 spontaneously without waiting for the polling (superimposition requesting data that is transmitted periodically) from the transmission unit 1. Therefore, according to this communication system, there is an advantage in that a response period from when an event of some sort happens in the sensor device 9 connected to the second monitoring terminal 221 to when the load (lighting apparatus 3) is controlled with respect to this event can be shortened.

In the present embodiment, the second monitoring terminal 221, upon receiving the superimposition requesting data from the transmission unit 1 in the transmission segment 103 of the transmission signal, transmits the superimposition response data to the transmission unit 1 in the reply segment 104 immediately thereafter (in the same frame), but the configuration is not limited thereto. That is, the second monitoring terminal 221, instead of transmitting the superimposition response data in the reply segment 104 immediately after the transmission segment 103 in which the superimposition requesting data is received, may transmit the superimposition response data in the reply segment 104 subsequent thereto (in the subsequent frame).

Figure 9:
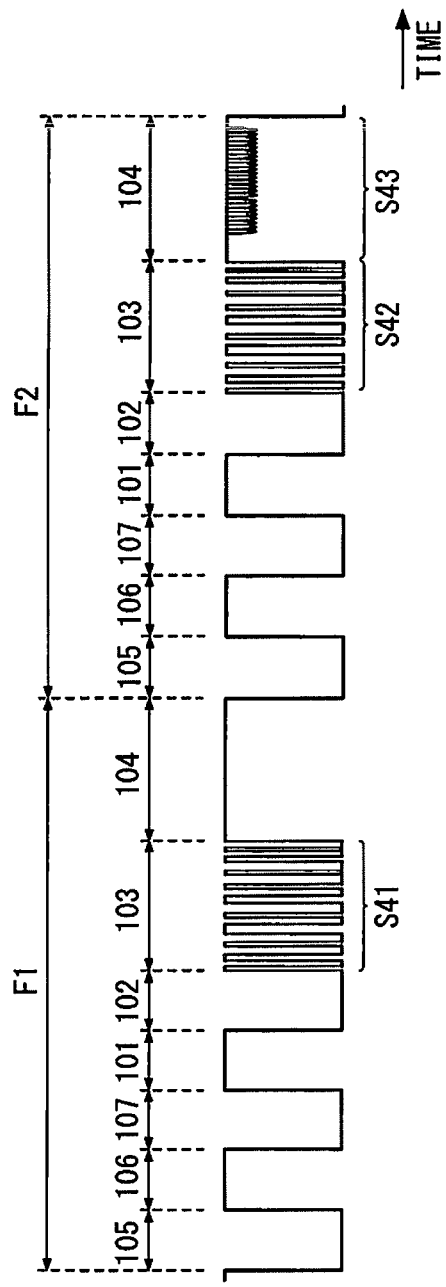
FIG. 9 is an explanatory diagram illustrating yet another operation of the communication system according to Embodiment 1.

FIG. 9 shows an example in which the superimposition requesting data is transmitted from the transmission unit 1 in the transmission segment 103 of the first frame F1 (S41 in FIG. 9) and the superimposition response data is transmitted from the second monitoring terminal 221 in the reply segment 104 of the second frame F2 subsequent to the first frame F1 (S43). However, in this case, interference, in the reply segment 104, between the response data that is transmitted from the first terminal 21 to the transmission unit 1 and the superimposition response data that is transmitted from the second monitoring terminal 221 to the transmission unit 1 needs to be avoided.

Thus, the segment securing unit 18 is configured so as to transmit the securing data, through the transmission communication unit 11, with not only specific superimposition response data or response data but also the superimposition requesting data from the superimposition requesting unit 17 as a trigger. That is, the segment securing unit 18 transmits the securing data in the transmission segment 103 of the second frame F2 with the superimposition requesting data that is transmitted in the transmission segment 103 of the first frame F1 as a trigger (S42).

Accordingly, the transmission unit 1 can secure the reply segment 104, in the second frame F2, in which the superimposition response data is received from the second monitoring terminal 221. Therefore, the superimposition communication unit 16 can receive the superimposition response data, while avoiding interference, in the reply segment 104, between the response data that is transmitted from the first terminal 21 to the transmission unit 1 and the superimposition response data that is transmitted from the second monitoring terminal 221 to the transmission unit 1.

Furthermore, as described above, the second terminal 22, when an amount of data that is to be transmitted is so large that transmission thereof is not completed in one reply segment 104, transmits the remaining data in the subsequent reply segment 104. Thus, the segment securing unit 18 changes a frequency of transmission of the securing data according to the data amount of the superimposition response data such that the larger the data amount of the superimposition response data that is received from the second monitoring terminal 221 is, the longer the reply segment 104 that is secured. That is, the segment securing unit 18 determines the frequency of transmission of the securing data, from one to a plurality of frequencies, such that all the reply segments 104 that are required for receiving the superimposition response data from the second monitoring terminal 221 are secured for superimposition of the superimposition signal, the frequency of the transmission being the same as the number of the required reply segments 104. Note that, the segment securing unit 18 determines the data amount of the superimposition response data by length information included in the superimposition response data, for example.

For example, if a data amount can be transmitted in one reply segment 104, the segment securing unit 18 sets the frequency of transmission of the securing data to one, and if a data amount is transmittable in two reply segments 104, the segment securing unit 18 sets the frequency of transmission of the securing data to two. Accordingly, even in a case where it is not possible to transmit the data in one reply segment 104, the superimposition communication unit 16 can avoid interference, in the reply segment 104, between the response data that is transmitted from the first terminal 21 to the transmission unit 1 and the superimposition response data that is transmitted from the second monitoring terminal 221 to the transmission unit 1.

Embodiment 2

A communication system of the present embodiment differs from the communication system of Embodiment 1 in that a superimposition requesting unit 17 employs a superimposition signal for transmitting superimposition requesting data instead of a transmission signal. Hereinafter, constituent elements similar to Embodiment 1 are provided with the same reference sign, and redundant description thereof will be omitted appropriately.

In the present embodiment, the superimposition requesting unit 17 is configured to transmit the superimposition requesting data to a second terminal 22 (second monitoring terminal 221) via a superimposition communication unit 16 in a reply segment 104 of the transmission signal with the superimposition signal. Since the data amount that is transmittable with the superimposition signal in one frame (of transmission signal) is large compared with that with the transmission signal, according to the configuration of the present embodiment, an upper limit of the data amount that is transmittable as the superimposition requesting data increases.

Thus, the superimposition requesting unit 17 can transmit data, to the second monitoring terminal 221, in which contents of superimposition response data from the second monitoring terminal 221 are specified in detail as the superimposition requesting data. Specifically, the superimposition requesting data includes, other than address data composed of the address of the second monitoring terminal 221, information in which time information (information indicating to which period the data relates), location information (information indicating the location from which the data was obtained), and the like are specified in detail.

In the present embodiment, interference, in the reply segment 104, between response data that is transmitted from a first terminal 21 to a transmission unit 1 and the superimposition requesting data that is transmitted from the transmission unit 1 to the second monitoring terminal 221 needs to be avoided. Thus, a segment securing unit 18 is configured to also transmit securing data from a transmission communication unit 11 in a transmission segment 103 (in the same frame) immediately before the reply segment 104 in which the superimposition requesting unit 17 transmits the superimposition requesting data.

Further, in the present embodiment, since the superimposition requesting data is transmitted in the reply segment 104 and the superimposition response data is transmitted in the subsequent reply segment 104 (that is, the reply segment 104 in the frame subsequent to the frame including the reply segment 104 in which the superimposition requesting data is transmitted), interference, in the reply segment 104, between the response data that is transmitted from the first terminal 21 to the transmission unit 1 and the superimposition response data needs to be avoided. Thus, the segment securing unit 18 is configured, similarly to the example shown in FIG. 9, to transmit the securing data from the transmission communication unit 11 with the superimposition requesting data from the superimposition requesting unit 17 as a trigger.

Hereinafter, an operation, in the communication system of the present embodiment, in a case where a lighting apparatus 3 connected to a second control terminal 222 is controlled according to a monitoring input generated in the second monitoring terminal 221 will be described with reference to FIGS. 10 and 11.

Figure 10:
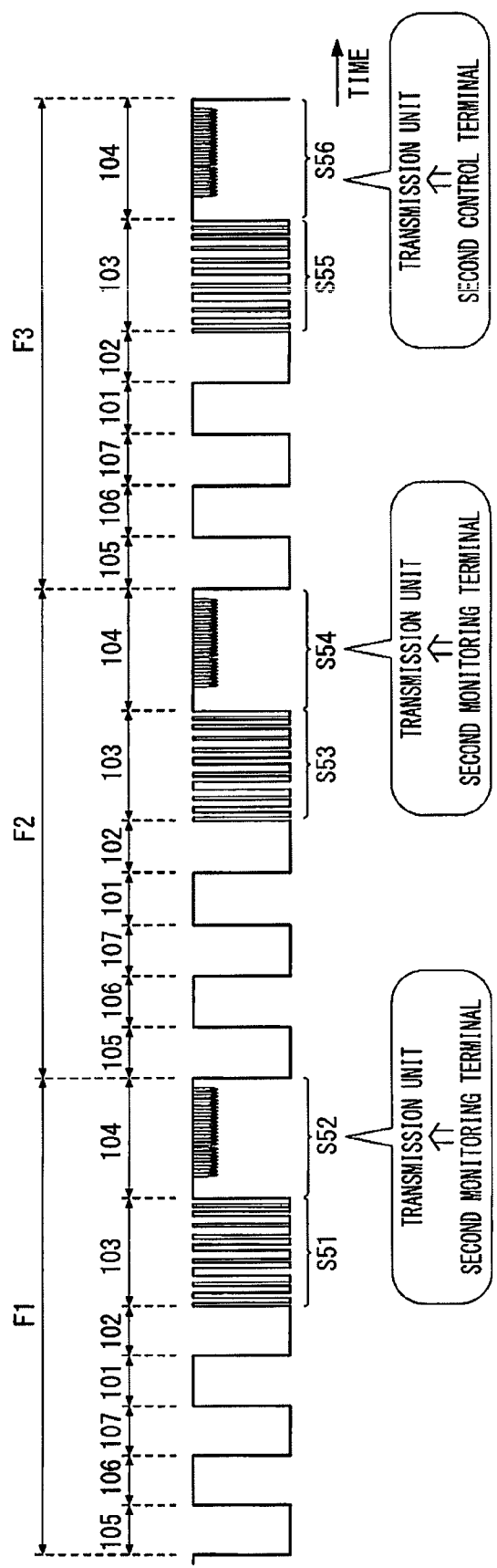
FIG. 10 is an explanatory diagram illustrating an operation of a communication system according to Embodiment 2.
Figure 11:
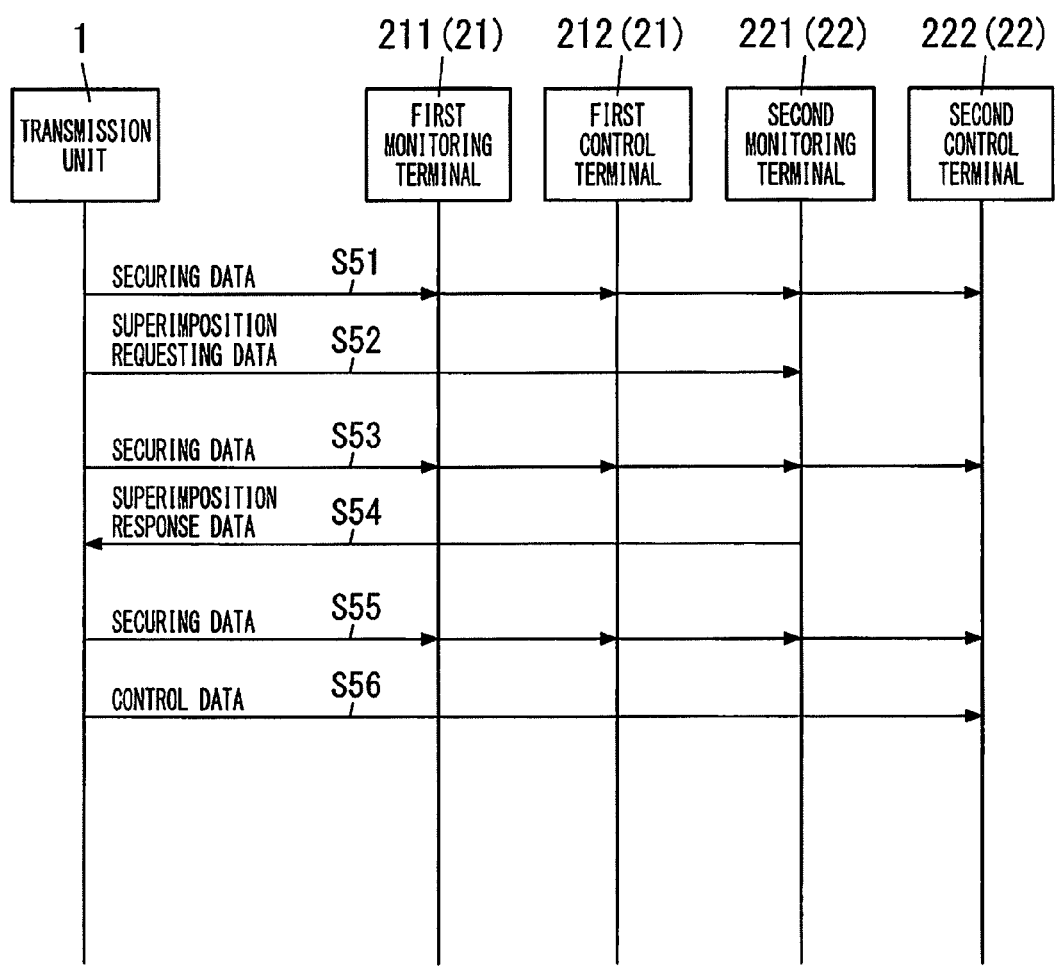
FIG. 11 is an explanatory diagram illustrating the operation of the communication system according to Embodiment 2.

The transmission unit 1 transmits the securing data from the segment securing unit 18 in the transmission segment 103 of a first frame F1 (S51 in FIGS. 10 and 11). Accordingly, the reply segment 104 (in the first frame F1) subsequent to the transmission segment 103 in which the securing data is transmitted is secured for superimposition of the superimposition signal, and the transmission unit 1 transmits the superimposition requesting data to the second monitoring terminal 221 in this reply segment 104 with the superimposition signal (S52).

Further, the transmission unit 1 transmits the securing data from the segment securing unit 18 in the transmission segment 103 of a second frame F2 with the superimposition requesting data that is transmitted in the reply segment 104 of the first frame F1 as a trigger (S53). In the reply segment 104 of the second frame F2, the second monitoring terminal 221 that has received the superimposition requesting data including its own address transmits, in response to the reception thereof, monitoring data corresponding to the monitoring input from a sensor device 9 as the superimposition response data to the transmission unit 1 with the superimposition signal (S54).

The transmission unit 1, upon receiving the superimposition response data composed of the monitoring data with the superimposition communication unit 16, determines whether this monitoring data is associated with a first control terminal 212 or the second control terminal 222 in the control table. When the second control terminal 222 is determined to be associated therewith, the transmission unit 1 transmits the securing data from the segment securing unit 18 in the transmission segment 103 of a third frame F3 subsequent to the second frame F2 (S55).

Accordingly, the reply segment 104 subsequent to the transmission segment 103 in which the securing data is transmitted is secured for superimposition of the superimposition signal, and the transmission unit 1 transmits control data to the second control terminal 222 with the superimposition signal in this reply segment 104 (in the third frame F3) (S56). The second control terminal 222 that has received the control data performs dimming control and/or color adjustment control of the lighting apparatus 3 according to the control data.

Figure 12:
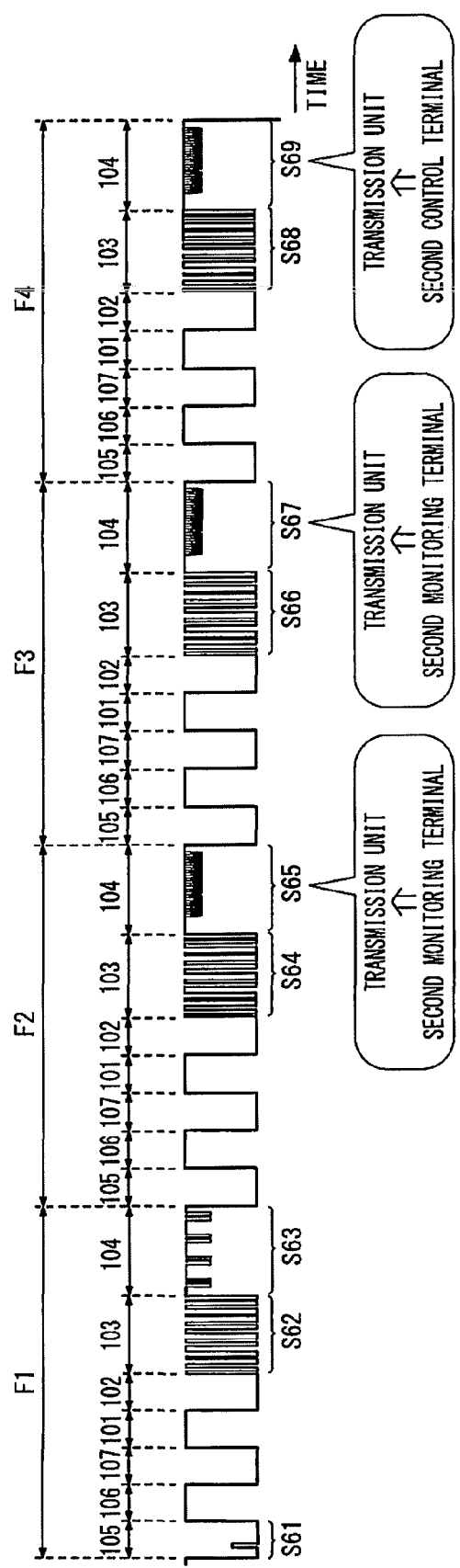
FIG. 12 is an explanatory diagram illustrating another operation of the communication system according to Embodiment 2.
Figure 13:
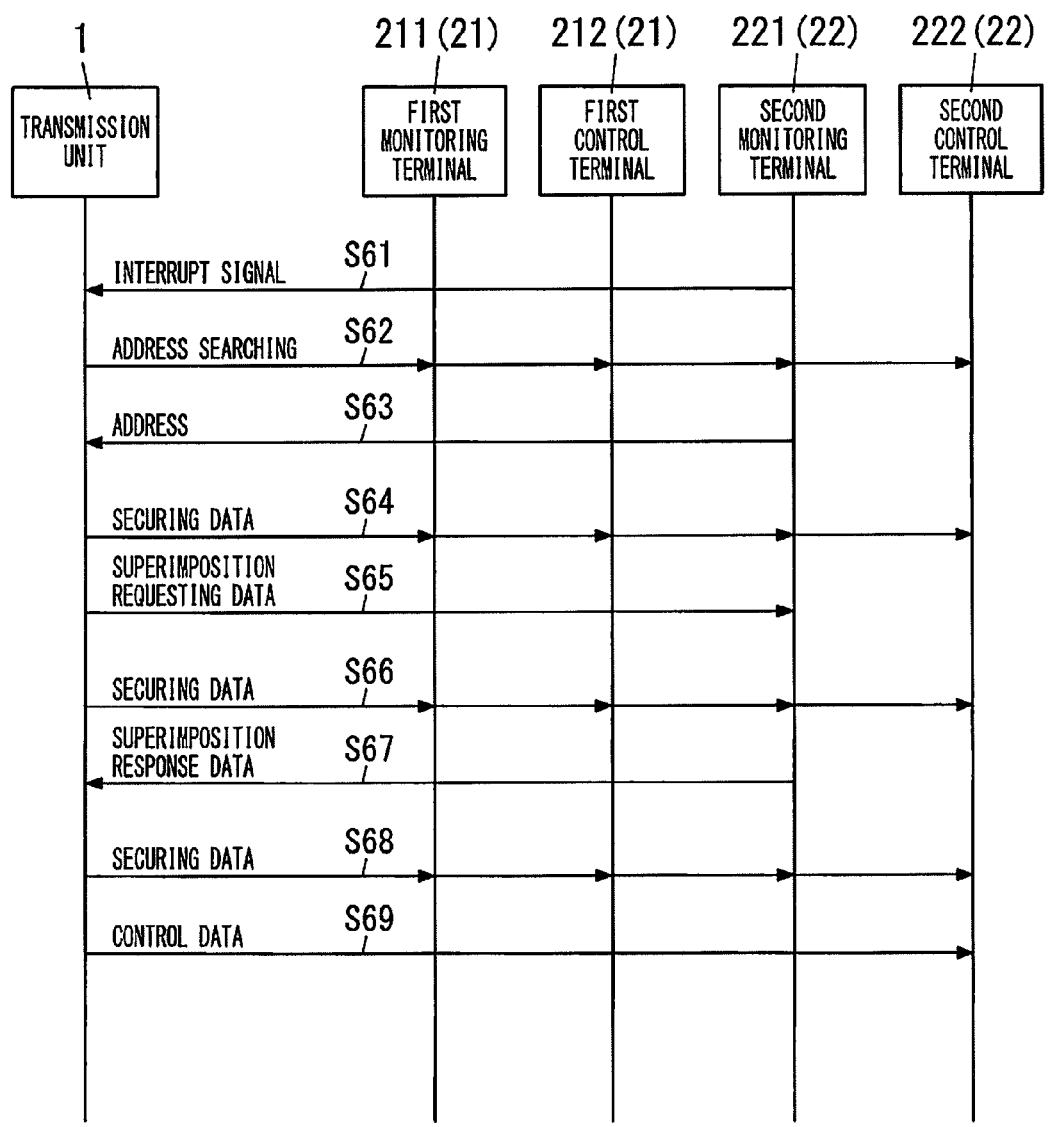
FIG. 13 is an explanatory diagram illustrating the operation of the communication system according to Embodiment 2.

Next, as another example, an operation in a case where an interrupt signal is generated in the second monitoring terminal 221 will be described with reference to FIGS. 12 and 13. Note that since operations in "S66" to "S69" in FIGS. 12 and 13 are similar to those in "S53" to "S56" in FIGS. 10 and 11, description thereof will be omitted here.

The transmission unit 1, upon detecting the interrupt signal generated in the second monitoring terminal 221 in an interrupt segment 105 of the first frame F1 of the transmission signal (S61 in FIGS. 12 and 13), switches the mode data included in the transmission signal in the transmission segment 103 from a normal mode to an interrupt polling mode. In the interrupt polling mode, the transmission unit 1 performs address searching in which response requesting data composed of upper bits of the address is transmitted with the response requesting unit 12 in the transmission segment 103 of the transmission signal (S62), with the address (upper bits) being changed sequentially. The second monitoring terminal 221 that has generated the interrupt signal transmits, if the address (upper bits) in the response requesting data matches the upper bits of its own address, the lower bits of its own address as the response data to the transmission unit 1 in the reply segment 104 of the first frame F1 (S63). Accordingly, the transmission unit 1 receives, with the response receiving unit 13, the address of the second monitoring terminal 221 that has generated the interrupt signal as the response data in the first frame F1.

The transmission unit 1 transmits, upon acquiring the address of the second monitoring terminal 221 that has generated the interrupt signal, the securing data from the segment securing unit 18 in the transmission segment 103 of the second frame F2 subsequent to the first frame F1 (S64). Further, the transmission unit 1 transmits the superimposition requesting data from the superimposition requesting unit 17 to the second monitoring terminal 221 by designating the address acquired in S63 in the reply segment 104 of the second frame F2 secured for superimposition of the superimposition signal (S65). Note that, after the generation of the interrupt signal, all communication between the second monitoring terminal 221 and the transmission unit 1 is performed with the transmission signal until the transmission unit 1 acquires the address of the second monitoring terminal 221.

According to the communication system with the configuration described above, since the superimposition requesting unit 17 is configured to transmit the superimposition requesting data with the superimposition signal, the upper limit of the data amount that is transmittable to the second terminal 22 as the superimposition requesting data increases. Therefore, the transmission unit 1 can specify necessary contents of the superimposition response data relatively in detail with the superimposition requesting data.

Although the second monitoring terminal 221 of the present embodiment is configured to transmit the superimposition response data in the reply segment 104 in the frame subsequent to the frame including the reply segment 104 in which the superimposition requesting data is transmitted from the superimposition requesting unit 17, the configuration is not limited thereto, and the second monitoring terminal 221 may be configured to transmit the superimposition response data in the reply segment 104, that is, the same frame, in which the superimposition requesting data is transmitted. That is, in a case where transmission of the superimposition requesting data is completed with only part of the reply segment 104 due to the data amount of the superimposition requesting data being relatively small or the like, the second monitoring terminal 221 may transmit the superimposition response data using the remaining period of the same reply segment 104.

In this case, both of transmissions can be completed in one reply segment 104: a transmission of the superimposition requesting data from the transmission unit 1 to the second monitoring terminal 221; and a transmission of the superimposition response data from the second monitoring terminal 221 to the transmission unit 1. Therefore, there is an advantage in that the amount of time required for the transmission unit 1 to acquire the superimposition response data from the second monitoring terminal 221 can be reduced. Note that, in this case, the segment securing unit 18 does not need to transmit the securing data again in the transmission segment 103 subsequent to the reply segment 104 in which the superimposition requesting data is transmitted.

The other configurations and functions are similar to those of Embodiment 1.

Incidentally, in each of the above embodiments, an exemplary operation of the communication system is illustrated in a case where a load (lighting apparatus 3) connected to the second control terminal 222 is controlled according to a monitoring input generated in the second monitoring terminal 221. However, control of the load is not an essential configuration of the communication system. That is, in a case where the communication system is applied to a system in which only a monitoring input of a sensor device 9 is collected, for example, the transmission unit 1 may be configured so as to acquire superimposition response data from the second monitoring terminal 221, and thus transmission of control data is not an essential configuration of the transmission unit 1.

Moreover, in each of the above embodiments, an exemplary configuration is illustrated in which the superimposition communication unit 16 is incorporated in the transmission unit 1. However, the configuration is not limited thereto, and the superimposition communication unit may be provided separately from the transmission unit 1 and be connected to the transmission unit 1.

Although the present invention has been described with a number of preferred embodiments, various modifications and variations are possible by those skilled in the art without departing from the spirit or scope of the invention, that is, without departing from the claims.

The invention claimed is:

1. A communication system comprising:
a transmission unit that repeatedly transmits a transmission signal for communication to a communication line,
a first terminal apparatus that communicates with at least the transmission unit by the transmission signal that conforms to a first protocol; and
a second terminal apparatus that communicates with at least the transmission unit by a superimposition signal that is superimposed on the transmission signal and conforms to a second protocol different from the first protocol, the transmission unit, the first terminal apparatus and the second terminal apparatus being connected to the communication line, and the first terminal apparatus and the second terminal apparatus being separately addressable relative to the transmission unit,
wherein the transmission signal is a time-division signal that is divided, frame by frame, into a plurality of regions in a time axis direction, including:
a transmission segment for transmitting data to the first terminal apparatus; and
a reply segment that is a time slot for receiving response data from the first terminal apparatus, and
wherein the transmission unit includes:
a superimposition requesting unit configured to transmit superimposition requesting data to the second terminal apparatus; and
a superimposition communication unit configured to receive superimposition response data that the second terminal apparatus transmits in the reply segment with the superimposition signal in response to the superimposition requesting data.

2. The communication system according to claim 1,
wherein the superimposition requesting unit is configured to transmit the superimposition requesting data to the second terminal apparatus in the transmission segment with the transmission signal, and
the second terminal apparatus includes a terminal apparatus side transmission communication unit configured to receive the superimposition requesting data transmitted with the transmission signal.

3. The communication system according to claim 1,
wherein the superimposition requesting unit is configured to transmit the superimposition requesting data to the second terminal apparatus in the reply segment with the superimposition signal.

4. The communication system according to claim 3,
wherein the superimposition communication unit is configured to receive the superimposition response data from the second terminal apparatus in the reply segment subsequent to the reply segment in which the superimposition requesting unit transmitted the superimposition requesting data.

5. The communication system according to claim 1,
wherein the transmission unit further includes a segment securing unit configured to transmit, with the transmission signal in the transmission segment, securing data for securing the reply segment for superimposition of the superimposition signal, by prohibiting transmission of the response data in the reply segment, with the superimposition requesting data as a trigger.

6. The communication system according to claim 1,
wherein the first terminal apparatus includes at least a first control terminal apparatus configured to control one or more first loads based on control data included in the transmission signal that is transmitted from the transmission unit,
the second terminal apparatus includes:
a second monitoring terminal apparatus configured to generate monitoring data having a relatively large data amount in response to the superimposition requesting data from the transmission unit, and transmit the monitoring data to the transmission unit as the superimposition response data; and
a second control terminal apparatus configured to control one or more second loads based on control data included in the superimposition signal that is transmitted from the transmission unit, and
the transmission unit has a control table in which an address of the second monitoring terminal apparatus is associated with an address of the second control terminal apparatus, and determines, with the control table, whether control data generated based on the monitoring data included in the superimposition response data received from the second monitoring terminal apparatus is to be transmitted to the first control terminal apparatus or the second control terminal apparatus.

7. A transmission unit used in a communication system in which the transmission unit, a first terminal apparatus that communicates with at least the transmission unit by a transmission signal for communication, conforming to a first protocol, and a second terminal apparatus that communicates with at least the transmission unit by a superimposition signal superimposed on the transmission signal and conforming to a second protocol different from the first protocol are connected to a communication line, the first terminal apparatus and the second terminal apparatus being separately addressable relative to the transmission unit, the transmission unit comprising:

a transmission communication unit configured to repeatedly transmit, to the communication line, the transmission signal, which is a time-division signal divided, frame by frame, into a plurality of regions in a time axis direction, including a transmission segment for transmitting data to the first terminal apparatus and a reply segment that is a time slot for receiving response data from the first terminal apparatus;
a superimposition requesting unit configured to transmit superimposition requesting data to the second terminal apparatus; and
a superimposition communication unit configured to receive superimposition response data that is transmitted from the second terminal apparatus in response to the superimposition requesting data with the superimposition signal in the reply segment.

8. The communication system according to claim 2,
wherein the transmission unit further includes a segment securing unit configured to transmit, with the transmission signal in the transmission segment, securing data for securing the reply segment for superimposition of the superimposition signal, by prohibiting transmission of the response data in the reply segment, with the superimposition requesting data as a trigger.

9. The communication system according to claim 3,
wherein the transmission unit further includes a segment securing unit configured to transmit, with the transmission signal in the transmission segment, securing data for securing the reply segment for superimposition of the superimposition signal, by prohibiting transmission of the response data in the reply segment, with the superimposition requesting data as a trigger.

10. The communication system according to claim 4,
wherein the transmission unit further includes a segment securing unit configured to transmit, with the transmission signal in the transmission segment, securing data for securing the reply segment for superimposition of the superimposition signal, by prohibiting transmission of the response data in the reply segment, with the superimposition requesting data as a trigger.

\* \* \* \* \*